(12) United States Patent
Blake et al.

(10) Patent No.: US 10,139,025 B2
(45) Date of Patent: Nov. 27, 2018

(54) FLUID CONNECTOR WITH LOCKING RING (71) Applicant: SARTORIUS STEDIM FMT SAS, Aubagne (FR)

(72) Inventors: Florian Blake, La Ciotat (FR); Jeremy Gibelin, Le Beausset (FR)

(73) Assignee: SANTORIUS STEDIM FMT SAS, Aubagne (FR)

( * ) Notice: Subject to any disclaimer, the term of this patent is extended or adjusted under 35 U.S.C. 154(b) by 138 days.

(21) Appl. No.: 15/118,794

(22) PCT Filed: Feb. 11, 2015

(86) PCT No.: PCT/FR2015/050328
§ 371 (c)(1),
(2) Date: Aug. 12, 2016

(87) PCT Pub. No.: WO2015/121581
PCT Pub. Date: Aug. 20, 2015

(65) Prior Publication Data
US 2017/0051859 A1 Feb. 23, 2017

(30) Foreign Application Priority Data
Feb. 14, 2014 (FR) ..................... 14 51184

(51) Int. Cl.
*F16L 37/084* (2006.01)
*F16B 21/18* (2006.01)
(52) U.S. Cl.
CPC ........ *F16L 37/0841* (2013.01); *F16B 21/186* (2013.01)
(58) Field of Classification Search
CPC ..... F16L 37/0985; F16L 37/091; F16L 37/04; F16L 37/025; F16L 37/08; F16L 37/0841
(Continued)

(56) References Cited

U.S. PATENT DOCUMENTS 3,428,340 A * 2/1969 Pelton ............... F16L 37/088
285/308
3,534,988 A * 10/1970 Lindsey ............ F16L 37/144
285/305
(Continued)

FOREIGN PATENT DOCUMENTS

DE  9208976 U1  8/1992
DE  20 2012 104229 U1  12/2012
EP  0 566 889 A  10/1993

OTHER PUBLICATIONS

International Search Report, dated Jun. 17, 2015, from corresponding PCT application.

*Primary Examiner* — David Bochna
(74) *Attorney, Agent, or Firm* — Young & Thompson (57) ABSTRACT

A female connector (1) configured to receive a male connector (2), having an annular exterior retaining rim (24), the female connector including a body (10), and a transverse slide (4) forming a housing, the housing (4) including two lateral grooves (41,42), the female connector including a separate deformable locking ring (3) capable of being inserted in the housing and of locking the male connector in the coupling position, the locking ring including two first concave arched portions (31), as viewed from the axis, and two second arched portions (32), with inverse curvature, i.e. convex when viewed from the axis, the second arched portions being capable of flexing towards the exterior during insertion of the male connector and capable of abutting on the external annular retaining rim and preventing withdrawal of the male connector, whereby after locking of the male connector in the female connector a definitive locking is obtained.

12 Claims, 4 Drawing Sheets (58) Field of Classification Search
USPC .................................................. 285/305, 308
See application file for complete search history.

(56) References Cited

U.S. PATENT DOCUMENTS

| | | | | |
|---|---|---|---|---|
| 3,922,011 | A * | 11/1975 | Walters | F16L 37/088 |
| | | | | 285/315 |
| 5,074,601 | A | 12/1991 | Spors et al. | |
| 5,447,342 | A * | 9/1995 | Mazhar | F16L 37/10 |
| | | | | 285/307 |
| 5,573,279 | A | 11/1996 | Rea et al. | |
| 6,361,064 | B1 * | 3/2002 | Hopf | B60R 21/2171 |
| | | | | 285/305 |
| 7,497,478 | B2 * | 3/2009 | Callahan | F16L 37/088 |
| | | | | 285/305 |
| 7,699,356 | B2 * | 4/2010 | Bucher | F16L 37/088 |
| | | | | 285/305 |
| 9,739,403 | B2 * | 8/2017 | Freter | F16L 37/0841 |
| 2002/0079698 | A1 * | 6/2002 | Walker | F16L 37/56 |
| | | | | 285/305 |
| 2009/0284007 | A1 * | 11/2009 | Schmidt | F16L 37/0841 |
| | | | | 285/317 |
| 2013/0140808 | A1 * | 6/2013 | Bongiorni | F16L 37/088 |
| | | | | 285/81 |
| 2016/0281894 | A1 * | 9/2016 | Freter | F16L 37/0841 |

\* cited by examiner

FLUID CONNECTOR WITH LOCKING RING

BACKGROUND OF THE INVENTION

Field of the Invention

The invention relates to fluid connectors, in particular for fluid connections or couplings that connect a female connector to a male connector for the purpose of connecting one fluid pipe to another pipe or to a container, in the field of biopharmaceutical applications.

More specifically, flexible tubes or pipes, and recipients or containers, are used in the biopharmaceutical field to transport and contain various biopharmaceutical substances, usually with the necessary aseptic precautions.

In the field of biopharmaceutical applications, fluids are transported and stored at low pressure, usually below 10 bar and most often below 2 bar, preferably at a pressure close to atmospheric pressure.

When using certain substances, it may be necessary to temporarily guarantee sufficiently sterile conditions after various components (pipes and/or containers) have been connected. To this end, it is convenient to use male-female connections that cannot be detached after coupling, which ensures that no undesired uncoupling will break the sterile conditions.

This kind of connection needs to be obtained by a simple and quick coupling. In practice, solutions are preferred where the coupling is achieved by an axial translational movement without rotation to insert the male connector into the female connector.

The aim is for the coupling to be definitive once established, thereby excluding all unlockable connector solutions used in the biopharmaceutical field.

Description of the Related Art

It is known, for example from patent EP-A-0566889, to use an intermediate locking part interposed radially between the male connector and the female connector, this intermediate part having the form of a ring.

It is also known, for example from document U.S. Pat. No. 5,573,279, to arrange flexible plastic tabs inside the female connector, integrally formed therewith, said flexible tabs being curving so as to catch behind a bead of the male end piece to prevent withdrawal.

However, the known solutions have various drawbacks, including the complex shapes of the elements that contribute to locking the male end piece in the female connector, and the poor radial and/or axial compactness of these locking elements.

There is therefore a need to provide an improvement that at least partially overcomes the aforementioned disadvantage of the known prior art.

BRIEF SUMMARY OF THE INVENTION

According to a first aspect, the invention relates to a female connector, for fluid connection, adapted for receiving a male connector having a retaining external annular rim, the female connector comprising a body with a bore of axis X, and a housing forming a slide (for example a slot) extending generally within a transverse plane YZ perpendicular to axis X, the housing comprising two parallel lateral grooves and the housing being open at least at one of its ends in the direction Z of the slide, the female connector comprising a deformable locking ring distinct from the body and added on, adapted to be inserted into the housing and to lock the male connector in the coupling position, the locking ring comprising two diametrically opposed first arched portions, concave as viewed from the axis X, and two diametrically opposed second arched portions of inverse curvature, meaning convex as viewed from the axis X, each of the second arched portions being interposed between two first arched portions, the second arched portions being adapted to flex outward during insertion of the male connector and to abut against the retaining external annular rim to prevent withdrawal of the male connector, whereby, after locking the male connector in the female connector, it is no longer possible to unlock the connection by manipulation or pressure on the locking ring and definitive locking is obtained.

With these arrangements, a locking ring is obtained that is of very small footprint axially and is very compact radially.

In addition, the shape of the locking ring is particularly simple, which results in a very advantageous cost.

Note that the connection cannot be disassembled and there is visible evidence if the lock has been tampered with, for example by visible damage to the locking ring.

In one embodiment, the first arched portions each form an arc centered on the axis X, with a first radius of curvature R1 of between 100% and 200% of the radius of the male connector, and the second arched portions each form an arc with a second radius of curvature R2 of between 70% and 130% of the first radius of curvature R1; this ensures that the second arched portions tend to tighten towards the axis when the first arched portions are pressed.

In one embodiment, the housing and the deformable ring are asymmetrical with respect to the transverse plane YZ, with the front side of the deformable ring having a bevel (or chamfer) shape; whereby the ramp effect facilitates spreading apart the second arched portions during insertion of the male connector, and the deformable ring can only be inserted in one of the two possible directions, meaning with front face/rear face foolproofing.

In one embodiment, the locking ring comprises at least one pin projecting in the axial direction, able to engage with at least one notch arranged in the front face of the slot forming the housing; this provides a simple and visual solution enabling proper manual or automated installation of the ring in the correct direction.

In one embodiment, the deformable ring comprises projections for retaining the ring in the housing along the direction Z of the slide, with corresponding recesses formed in the grooves of the housing; whereby the ring is retained in the housing in a substantially centered position after its insertion, possibly with some clearance.

In one embodiment, the housing is open at both ends along Z and is symmetrical with respect to the XY plane; whereby the deformable ring can be inserted from either side of the housing forming the slide.

In one embodiment, as an alternative to the aforementioned asymmetry, the housing is symmetrical with respect to the YZ plane, such that the deformable ring can be inserted in either of the two possible directions; whereby it is easier to provide automated assembly.

In one embodiment, the ring has a triple symmetry, with respect to planes XZ, XY, and YZ; such that there is no risk of error when assembling the deformable ring inside the housing.

In one embodiment, the body of the female connector is made of a first biocompatible plastic material and the deformable ring is made of a second plastic material, such that the respective materials of the female connector and the locking ring can be optimized; in particular, a second plastic material can be chosen having a mechanical performance that optimizes the compromise between rigidity and elasticity. In addition, the respective optimization of the two materials allows manufacturing these components at particularly advantageous costs.

In one embodiment, the second arched portions are inaccessible when the deformable ring is in position in the housing forming the slide, and the first arched portions remain accessible; thus, one cannot maneuver the second arched portions and a radial pressure exerted inwardly on the first arched portions tends to accentuate the curvature of the second arched portions and therefore tends to reinforce the locking, such that it is impossible to unlock the connection, even unintentionally or if dropped or subjected to impacts.

In one embodiment, when the deformable ring is in position in the female connector, the first arched portions do not protrude from the surface of the body of the female connector, and are preferably flush with it, such that pressure can be exerted on the first arched portions toward the axis but traction away from the axis cannot be exerted; this arrangement helps to ensure that the connection is not unlockable.

According to a second aspect, the invention relates to a deformable ring of molded plastic, suitable for use as a locking ring in a female connector as described above, the deformable ring comprising two diametrically opposed first arched portions, concave as viewed from the axis X, and two diametrically opposed second arched portions of inverse curvature, meaning convex as viewed from the axis X, each of the second arched portions being interposed between two first arched portions.

DETAILED DESCRIPTION OF THE PREFERRED EMBODIMENTS

Below is a detailed description of several embodiments of the invention with examples and with reference to the drawings.

In the example shown, a female connector 1 is to be connected to a male connector 2 by a coupling movement during which the male connector is inserted into the female connector along an axial direction X.

For each of these connectors, in the present document the term "front" refers to the part closest to the complementary opposing connector, and the term "back" refers to the part furthest from the opposing connector.

The female connector 1 comprises in its rear portion a tubular end piece 17 intended for receiving a flexible tube (not shown), and in its front portion an interface for coupling with the male connector 2; said coupling interface will be described below.

Similarly, the male connector 2 comprises in its rear portion a tubular end piece 27 intended for receiving a flexible tube, and in its front portion an interface for coupling with the female connector, which will be discussed further below.

It should be noted here that the female connector and/or the male connector could have, in their rear portions, instead of an end piece for receiving a tube as shown, a flange for connecting to a container such as a flexible or rigid bag or a filter, for example.

Each of the tubular end pieces 17,27 is rotationally symmetrical about axis X, and they each comprise one or more external catches 19,29 to retain the flexible tube, and a stop flange 18,28 which the flexible tube can abut against when inserted onto the end piece. As is known per se, a clamping collar may be added around the flexible tube and the end piece.

The male connector 2 comprises an axial passage 26 that is rotationally symmetrical about the axis X, which allows passage of the fluid being conveyed through the fluid coupling.

Starting from its front end portion, the male connector first comprises an entry chamfer 25, then an annular groove 21 for receiving a conventional O-ring 9, then a first intermediate portion 20 provided with longitudinal ribs 73, then a tapered portion 23 which flares outwardly and towards the back of the male connector.

Still in the rearward direction of the connector, the tapered portion 23 is extended by an annular rim 24 which forms a shoulder intended to bear against a complementary surface and to prevent removal of the male connector as will be seen further below.

Behind the removal-preventing annular rim 24, the male connector comprises a second intermediate portion 22 with a ring 72 having four small reinforcements 74, said ring with reinforcements serving as gripping means for pushing the male connector towards the female connector and also serving as an axial stop for the insertion movement.

Behind the ring 72, there is the flange 28 and the tubular end piece 27 already described.

The female connector 1 comprises an axial passage 15 that is rotationally symmetrical about the axis X, allowing passage of the fluid conveyed through the fluid connection.

Starting from its back end portion, the female connector 1 comprises the tubular end piece 17 already described, then a main body 10 for receiving the front portion of the male connector, with a bore of a slightly larger diameter than the outer diameter of the front portion of the male connector 2, to permit insertion of the front portion of the male connector and to be able to exert radial pressure on the O-ring 9 to ensure the sealing function.

Facing the tapered portion 23, the body 10 has an inner dimension that increases until it reaches a housing 4 for the locking ring 3 which will be discussed further below.

A housing is provided in the front portion of the female connector, forming a slide 4 extending in a transverse plane YZ perpendicular to the axis X. In the current case, the housing forming a slide is presented as a transverse slot. In addition, in the example illustrated, this slot is open at both sides in the transverse direction Z which allows insertion of a locking ring.

In the example shown, the housing 4 comprises a first groove 41 and second groove 42 which face each other and are arranged symmetrically with respect to the XZ plane.

Finally, the body 10 of the female connector comprises a front ring 11 which forms the front end and against which the ring 72 of the male connector will abut at the end of the insertion movement. The body 10 of the female connector also comprises a back ring 12 at the back of the housing, and therefore the housing 4 is interposed between the front ring 11 and the back ring 12.

It should be noted here that it is not strictly necessary for the slot 4 to be open at both sides. In an alternative (not shown), one side may be at least partially closed which would form a bottom for the housing 4, while the opposite side would constitute the mouth through which the locking ring 3 is inserted.

The locking ring 3 already mentioned is intended to be inserted into said housing 4 of the body of the female connector. The locking ring 3 is formed as a closed deformable ring, meaning that it can be deformed radially outward during the movement of inserting the male connector into the female connector.

More specifically, the locking ring comprises two diametrically opposed first arched portions 31, concave as viewed from the axis X, and two diametrically opposed second arched portions 32 of inverse curvature, meaning convex as viewed from the axis X, each of the second arched portions being interposed between two first arched portions. In other words, when traveling along the ring circumferentially, one encounters a first arched portion, then a second arched portion of inverse curvature, then another first arched portion, and finally another second arched portion of inverse curvature. It should be noted that the cross-section of each of the arched portions remains relatively constant, and moreover that the cross-section of the ring does not change substantially from a first arched section to a second arched section or vice-versa.

The first arched portions 31 are concave as viewed from the axis X, meaning that their curvature is directed toward the inside of the ring, while the second arched portions 32 are convex as viewed from the axis X, meaning that their curvature is directed toward the outside of the ring.

Figure 3:
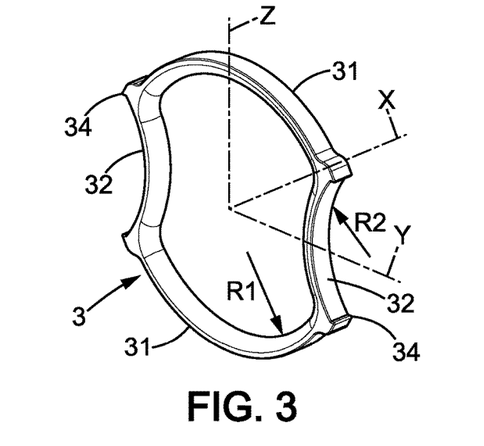
FIG. 3 is a perspective view of the locking ring.

Advantageously, the first arched portions 31 here each form an arc centered on axis X, with a first radius of curvature R1 (FIG. 3) of between 100% and 200% of the radius R0 of the male connector, and the second arched portions 32 each form an arc with a second radius of curvature R2 of between 70% and 130% of the first radius of curvature R1.

The second arched portions 32 are adapted to flex outwardly during insertion of the male connector, in particular when the tapered portion 23 presses on the ring. After complete insertion of the male connector, the external annular rim 24 has passed beyond the ring, and the ring is returned to its rest position and then abuts against the retaining external annular rim 24 to prevent removal of the male connector.

Figure 4:
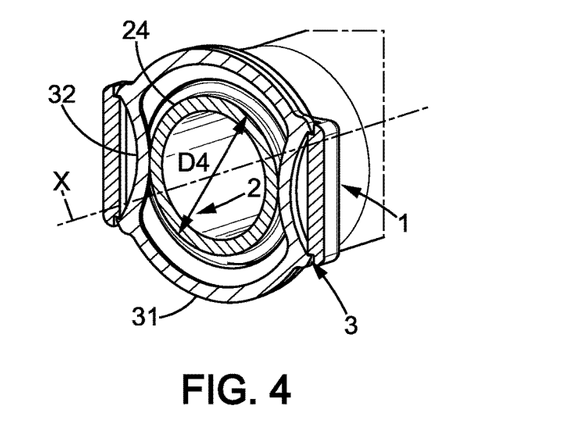
FIG. 4 is perspective view of a cross-section of the connection device.

When the locking ring 3 is at rest, the distance D3 (FIGS. 4 and 5) between the two second arched portions is slightly smaller than the diameter D4 of the second intermediate portion 22 of the male connector behind the annular rim 24.

Figure 5:
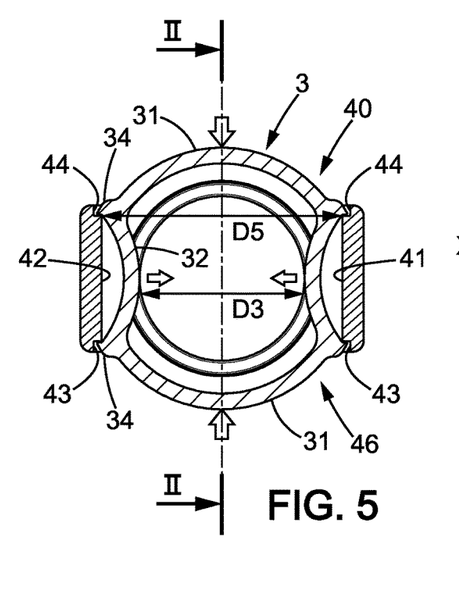
FIG. 5 shows a cross-section of the connection device.
Figure 6:
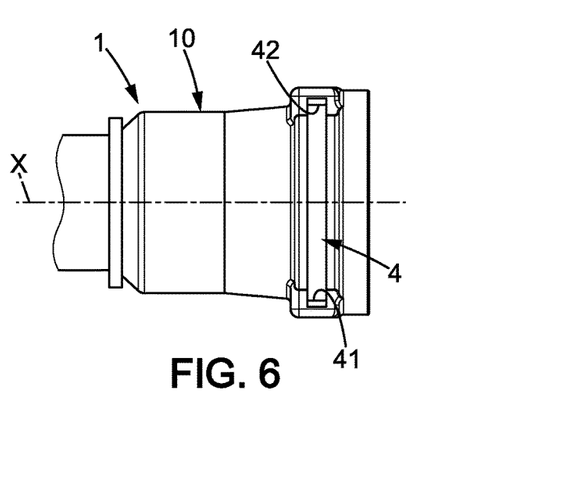
FIG. 6 shows a top view of the female connector without the locking ring.

Note that the second arched portions 32 are inaccessible from the outside when the deformable ring is in position in the housing 4, and only the first arched portions 31 remain accessible to a certain extent; but, as is illustrated in FIG. 5, a radial inward pressure tends to accentuate the curvature of the second arched portions and therefore tends to reinforce the locking, so that it is impossible to unlock the connection, even unintentionally or if dropped or if the connector strikes an object.

Figure 1:
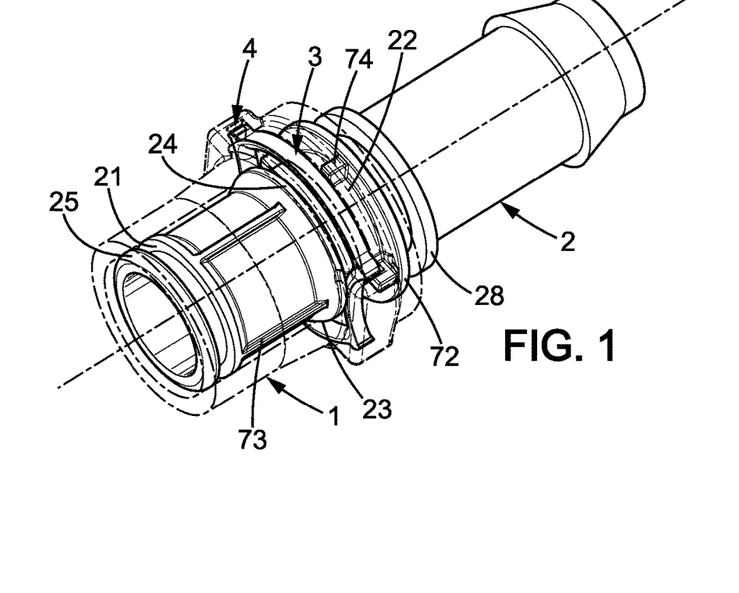
FIG. 1 is a perspective view of the connection device of the invention.
Figure 2:
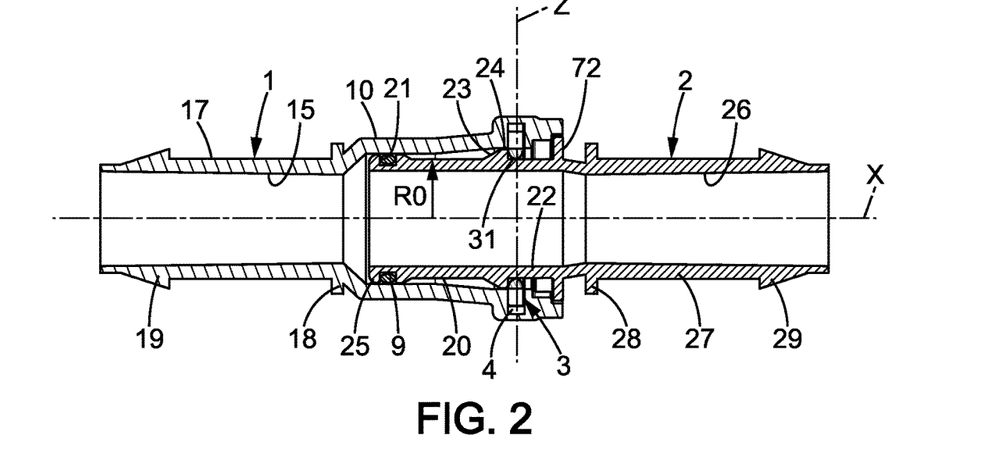
FIG. 2 is an axial sectional view of the connection device of FIG. 1, in the coupled position, along section line II-II shown in FIG. 5.

Advantageously, when the deformable ring 3 is in position in the housing, the first arched portions 31 do not protrude from the surface of the body of the female connector, and therefore it is impossible to grip them with the fingers to attempt to unlock the connection. One will note that in the example illustrated in FIGS. 1 and 4, the first arched portions 31 are flush with the surface of both the back ring 12 and front ring 11. There is also no play in the axial direction that would allow inserting an object to attempt to spread the first radial portions apart in order to break the locking connection. Therefore, the inaccessibility of the second arched portions 32 and the inability to pull on the first arched portions 31 result in it being impossible for user manipulations to unlock the connection. Only substantial damage to the locking ring 3 or to the body 10 of the female connector can lead to such a result, but then there would be visible proof on the parts.

One will also note the remarkable compactness of this solution in the radial direction: the total outside diameter of the locking ring does not exceed 125% of diameter D4, meaning it does not exceed 250% of the radius R0 of the front portion of the male connector. A small footprint in the axial direction is also obtained with this solution, because the thickness of the deformable ring 3 along X is several times smaller than the effective diameter of the axial passage of the connection.

One will note the advantageous symmetrical arrangement of the deformable ring 3, which is in effect symmetrical with respect to the XZ plane and to the XY plane.

Similarly, it should be noted that the grooves 41 and 42 could be partially open; it is not necessary for them to be completely closed: it is sufficient if they impede access to the second arched portions 32.

Prior to insertion of the male connector, the locking ring 3 can be maintained in a standby position within the housing by various means. In the illustrated example, the locking ring is held in the housing by projections 34, arranged substantially at the joining between the first arched portions and the second arched portions, giving four projections 34 which could also be called hooks, catches, or claws. Said projections 34 extend outward generally in the Y direction. Facing recesses 43,44 are provided in the grooves 41, 42, these recesses being intended to receive the projections of the locking ring when said ring reaches its position substantially centered on axis X.

Advantageously, the flexibility properties of the ring are used not only for coupling the male connector in the female connector, but also for the prior insertion of the locking ring 3 in the slot 4 along direction Z. More specifically, the distance along Y between the ends of the projections 34 is slightly greater than the distance D5 between the bottom of the grooves 41, 42. Thus, during insertion, the projections 34 are compressed slightly inwardly in order to slide along each of the grooves 41,42 and to return to the rest position when the projections 34 are facing said recesses 43,44. Precise positioning of the ring is not necessarily required: there can be some clearance as long as the ring is approximately centered on axis X.

The female connector 1 and the male connector 2 can be obtained by molding a first plastic material, in particular plastic materials biocompatible with the various biopharmaceutical substances concerned, for example polypropylene, polyethylene, polycarbonate, polysulfone, polyvinylidene chloride, polyethylenimine. Preferably, polyethylene or polypropylene is chosen.

The deformable locking ring 3 may be also created of the same material, for example polybutylene terephthalate, polypropylene, polyethylene, polycarbonate, polyoxymethylene, alternatively, and advantageously in some cases, the deformable ring 3 may be made of a second plastic material that is different from that of the connectors, typically polybutylene terephthalate or polycarbonate, with more targeted mechanical and elastic properties, as the locking ring is never in contact with the substances conveyed in the pipe to be connected. One can optimize the compromise between stiffness and elasticity of the second material. One can also take into account the changing properties of the material due to natural aging or caused by light or other radiation, or other physico-chemical exposure.

Figure 7A:
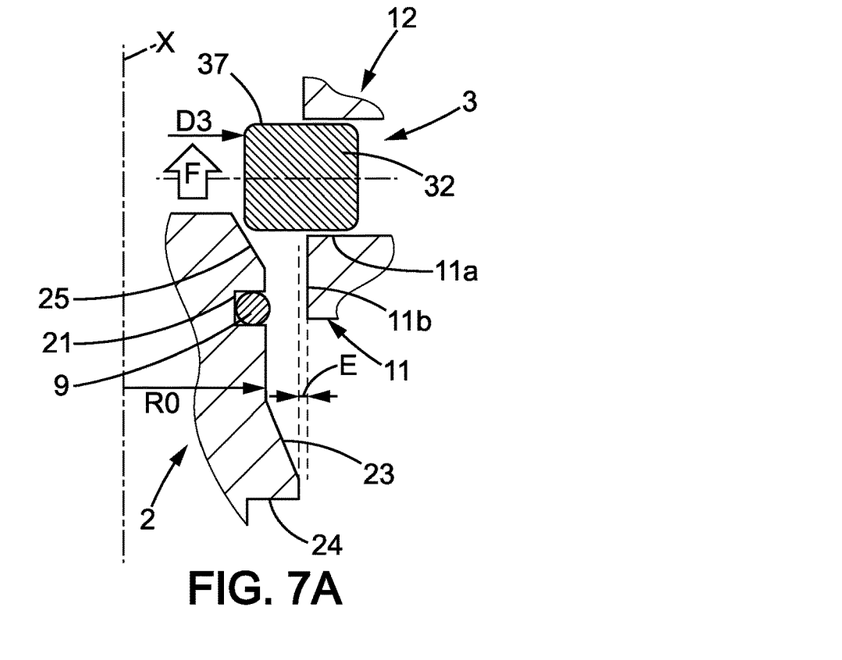
FIGS. 7A and 7B represent two variant profiles of the male end piece with a locking ring that is respectively symmetrical and asymmetrical with respect to the YZ plane.

As illustrated in FIG. 7A, in the case where the male connector 2 has entry ramps 25,23 of little slope, one can use a second arched portion 32 having a cross-section that is symmetrical with respect to the YZ plane. In this case, the locking ring can be formed with a triple symmetry, namely a triple symmetry with respect to the planes XZ, YZ, and XY, such that there is no risk of error when assembling the deformable ring in the housing 4. In addition, this triple symmetry may facilitate automation of inserting the ring into a female connector, as the locking rings can be fed in succession to a robot manipulator by means of a relatively simple vibrating bowl.

Figure 7B:
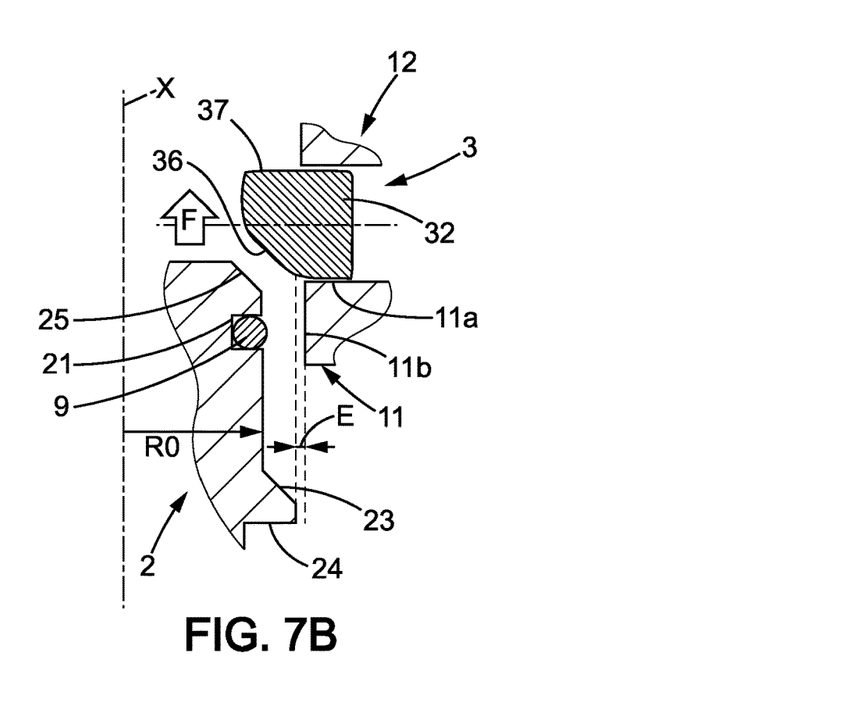

As illustrated in FIG. 7B, to facilitate deflection of the deformable ring at the time of insertion, for example when the entry ramps 25,23 are more pronounced, a beveled face 51a is provided on the front face of the ring, which reduces the insertion forces F and facilitates the spreading apart of the arched portions 32 of the locking ring. However, on the opposite side of the ring cross-section (back face 37), a straight profile is maintained so that the outer rim 24 of the male connector lies flat against the back face 37 of the ring. Thus, pulling on the male connector after coupling will not tend to spread apart the second arched portions 32.

It should be noted that this "lying flat" also applies in the preceding case in FIG. 7A.

One will notice some clearance E between the male end piece and the inner diameter 11b, which ensures that the male end piece including the shoulder 24 passes beyond the front ring 11 of the slot of the female connector 1.

Figure 8A:
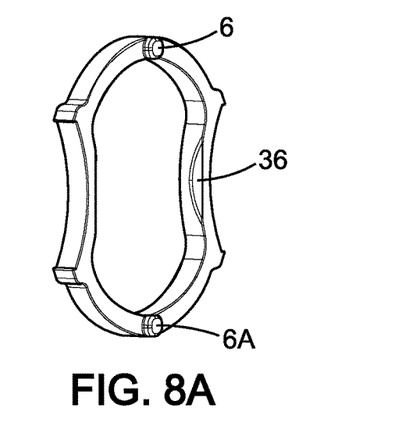
FIGS. 8A, 8B, and 8C illustrate another variant with position foolproofing affecting the locking ring and the housing in the female connector.
Figure 8B:
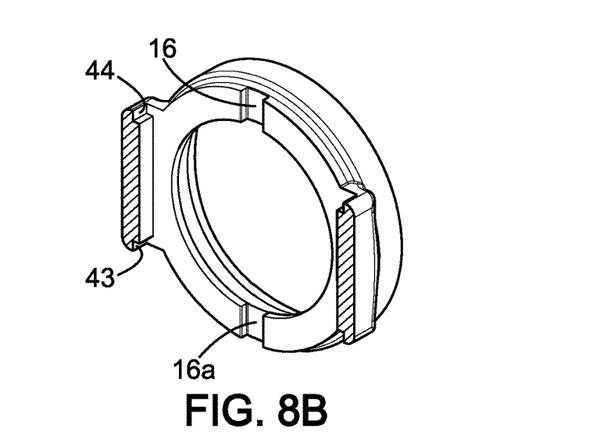
Figure 8C:
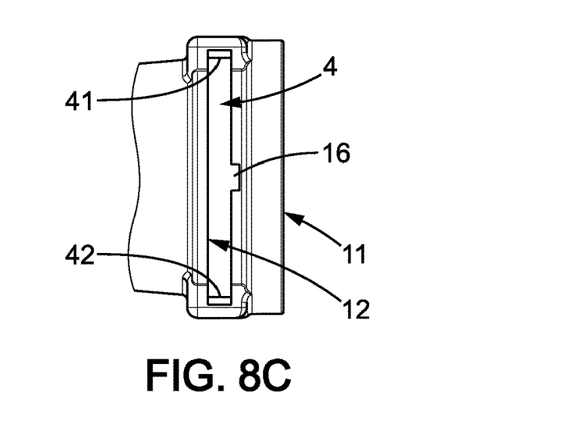

In an optional feature illustrated in FIGS. 8A, 8B, 8C, one can provide a foolproofing function to ensure the proper orientation when assembling the unlocking ring inside the housing 4. In particular, when using a ring having an asymmetrical cross-section (FIG. 7B) in the second arched portions 32, one must ensure that the beveled portion 36 is placed on the insertion side of the male connector.

For this purpose, two pins 6,6A are arranged in the central areas of the first arched portions 31 and extend (integral to these areas) in the direction of axis X. Two notches 16,16a shaped so as to be complementary to said pins 6,6A are formed in the midplane XZ of the slot (on the front wall of the slot), one at the top and one at the bottom. The deformable ring thus cannot be inserted in reverse with the beveled portion pointed toward the wrong side, because the pin 6 will abut against the back ring 12 where there is no notch.

It should be noted here that if the housing only allows insertion of the ring 3 from one open side, for example from above, only one notch 16 is required.

Note that in the example illustrated, the male connector can rotate within the female connector about X; there is no specific orientation for inserting the male connector into the female connector.

However, it is not excluded to provide an anti-rotation device which may, for example, be arranged between the small reinforcements 74 of the ring 72 of the male connector and the front ring 11 of the female connector.

Advantageously according to the invention, the particular shape of the locking ring, specifically with its second arched portions, presents an advantage concerning the strength of the lock; in case of unintentional impact, or in case of attempted fraudulent manipulation of the connection, the second arched portions tend to move inward and therefore reinforce the locking effect instead of decreasing it. As a result, only physical damage to the locking ring (which would then be visible) could result in unlocking the connection.

The invention claimed is:

1. A female connector, for fluid connection, adapted for receiving a male connector having a retaining external annular rim, the female connector comprising:
    a body with a bore of axis X,
    a housing forming a slide extending generally within a transverse plane YZ perpendicular to axis X,
    the housing comprising two parallel lateral grooves and the housing being open at least at one of its ends in the direction Z of the slide, and
    a deformable locking ring distinct from the body, adapted to be inserted into the housing and to lock the male connector in the coupling position,
    the deformable locking ring comprising two diametrically opposed first arched portions, concave as viewed from the axis X, and two diametrically opposed second arched portions of inverse curvature, meaning convex as viewed from the axis X, each of said second arched portions being interposed between said two first arched portions,
    the second arched portions being adapted to flex outward during insertion of the male connector and to abut against the retaining external annular rim to prevent withdrawal of the male connector, whereby, after locking the male connector in the female connector, a definitive locking is obtained.

2. The female connector according to claim 1, wherein the first arched portions each form an arc centered on axis X, with a first radius of curvature (R1) of between 100% and 200% of the external radius (R0) of the front portion of the male connector, the second arched portions each form an arc with a second radius of curvature (R2) of between 70% and 130% of the first radius of curvature (R1).

3. The female connector according to claim 1, wherein the housing and the deformable locking ring are asymmetrical with respect to the transverse plane YZ, with the front side of the deformable locking ring having a beveled shape.

4. The female connector according to claim 3, wherein the deformable locking ring comprises at least one pin projecting in the axial direction, able to engage with at least one notch arranged in the front face of the slot forming the housing.

5. The female connector according to claim 1, wherein the deformable locking ring comprises projections for retaining the deformable locking ring in the housing along the direction Z of the slide, with corresponding recesses formed in the grooves of the housing.

6. The female connector according to claim 1, wherein the housing is open at both ends along Z and is symmetrical with respect to the XY plane, it being possible to insert the deformable locking ring from either side of the housing forming the slide.

7. The female connector according to claim 6, wherein the housing is symmetrical with respect to the YZ plane, such that the deformable locking ring can be inserted in either of the two possible directions.

8. The female connector according to claim 7, wherein the deformable locking ring has triple symmetry, with respect to planes XZ, XY, and YZ.

9. The female connector according to claim 1, wherein the body of the female connector is made of a first biocompatible plastic material and the deformable locking ring is made of a second plastic material.

10. The female connector according to claim 1, wherein the second arched portions are inaccessible when the deformable locking ring is in position in the housing forming the slide and only the first arched portions remain accessible.

11. The female connector according to claim 1, wherein, when the deformable locking ring is in position in the female connector, the first arched portions do not protrude from the surface of the body of the female connector.

12. A deformable ring of molded plastic, suitable for use as said deformable locking ring of a female connector, the deformable ring extending annularly around a central axis and comprising:
two diametrically opposed first arched portions, concave as viewed from the central axis,
two diametrically opposed second arched portions of inverse curvature, meaning convex as viewed from the central axis, each of said second arched portions being interposed between said two first arched portions, and
outwardly extending projections arranged at the joining between the first arched portions and the second arched portions, for retaining the deformable locking ring in a housing of said female connector.

* * * * *

UNITED STATES PATENT AND TRADEMARK OFFICE
CERTIFICATE OF CORRECTION

PATENT NO. : 10,139,025 B2  
APPLICATION NO. : 15/118794  
DATED : November 27, 2018  
INVENTOR(S) : Florian Blake and Jeremy Gibelin

Page 1 of 1

It is certified that error appears in the above-identified patent and that said Letters Patent is hereby corrected as shown below:

On the Title Page

Item (73):  
"(73) Assignee: SANTORIUS STEDIM FMT SAS, Aubagne (FR)"  
Should read:  
-- (73) Assignee: SARTORIUS STEDIM FMT SAS, Aubagne (FR) --.

Signed and Sealed this  
Seventeenth Day of March, 2020

Andrei Iancu  
*Director of the United States Patent and Trademark Office*